United States Patent [19]

Ditges et al.

[11] 4,175,459
[45] Nov. 27, 1979

[54] FLYING SHEARS FOR SEVERING A RUNNING WIRE

[75] Inventors: Günter Ditges, Cologne; Wilhelm Mörs; Rolf Gärtner, both of Weiden, all of Fed. Rep. of Germany

[73] Assignee: Meyer, Roth & Pastor Maschinenfabrik GmbH, Cologne, Fed. Rep. of Germany

[21] Appl. No.: 897,649

[22] Filed: Apr. 18, 1978

[30] Foreign Application Priority Data

Jul. 20, 1977 [DE] Fed. Rep. of Germany ....... 2732770

[51] Int. Cl.² .............................................. B23D 25/08
[52] U.S. Cl. ..................................... 83/315; 83/320; 83/328; 83/600
[58] Field of Search .................. 83/328, 327, 320, 310, 83/51, 600, 315

[56] References Cited

U.S. PATENT DOCUMENTS 1,505,711  8/1924  Johnson ............................. 83/315 X
3,869,948  3/1975  Rau ................................... 83/328 X Primary Examiner—J. M. Meister
Attorney, Agent, or Firm—Spencer & Kaye

[57] ABSTRACT

A cutting apparatus for severing a wire continuously advanced through the apparatus along a wire path in a feeding direction parallel to the wire axis, comprises a carriage supported for displacement parallel to the feeding direction; two cutting members connected with the carriage; a support arm articulated to at least one of the cutting members; a displaceable anchor member to which the support arm is articulated by means of a support joint arranged on the support arm at a distance from the cutting member; a drive for moving the carriage in and opposite the feeding direction to cause, with the cooperation of the anchor member and the support arm, a motion of the cutting member in an arcuate path towards and, subsequent to severing, away from the wire and the other cutting member; and a force-exerting arrangement for shifting the anchor member to effect a displacement of the support joint and the support arm for affecting the course of the arcuate path of the cutting member.

11 Claims, 7 Drawing Figures

FLYING SHEARS FOR SEVERING A RUNNING WIRE

BACKGROUND OF THE INVENTION

This invention relates to flying shears for severing a continuously advanced wire, including two cooperating cutting members moved simultaneously in a direction parallel to the axis of the wire (that is, parallel to the direction of wire feed).

Diverse types of flying shears are known. The problem encountered in conventional structures resides in the provision of a sufficient free space between the wire to be cut and the knives of the cutting members subsequent to the cutting operation to ensure that the cutting device can be returned into its initial position. In many instances the cutting apparatus has to be adjustable within wide limits with regard to the wire lengths to be cut. Thus, the cutting apparatus has to be so designed that in case relatively short wire lengths are to be cut, it is capable of performing a sufficiently large number of cutting operations per time unit. In addition to the desirability of a wide selection of lengths, a narrow length tolerance of the cut wires is also required.

SUMMARY OF THE INVENTION

It is an object of the invention to provide improved flying shears of the above-outlined type which fulfill the requirements discussed earlier.

This object and others to become apparent as the specification progresses, are accomplished by the invention, according to which, briefly stated, the cutting apparatus for severing a wire continuously advanced through the apparatus along a wire path in a feeding direction parallel to the wire axis, comprises a carriage supported for displacement parallel to the feeding direction; two cutting members connected with the carriage; a support arm articulated to at least one of the cutting members; a displaceable anchor member to which the support arm is articulated by means of a support joint arranged on the support arm at a distance from the cutting member; a drive for moving the carriage successively in and opposite the feeding direction to cause, with the cooperation of the anchor member and the support arm, a motion of the cutting member in an arcuate path towards, and subsequent to severing, away from the wire and the other cutting member; and a force-exerting arrangement for shifting the anchor member to effect a displacement of the support joint and the support arm for affecting the course of the arcuate path of the cutting member.

The above-outlined arrangement according to the invention has several advantages. Thus, by supporting the cutting members by means of support arms there is obtained a toggle-like coupling wherein the toggle joint may be considered as being formed by the knives as they contact the wire. This means that a large cutting force may be generated with a relatively small displacement force applied to the carriage with which the cutting members are connected. It is a further advantage of the invention that by the particular support of the cutting members alone, an oppositely directed approaching motion of the two knives required for performing the severing operation proper and progressing in a direction transverse to the axis of the wire is effected by moving both knives towards one another in converging circular paths and, subsequent to the cutting operation, the knives are moved away from one another and from the wire, while the carriage still performs its forward motion (in the direction of wire advance).

According to a further feature of the invention, the support joint is carried by the anchor member on the machine frame for a reciprocating motion essentially transversely to the wire axis and is connected with a drive for effecting such reciprocation. Such an arrangement of the support joint of the support arm provides in a simple manner for the required clearance between the continuously advancing wire and the knives during the return motion of the carriage. Thus, a contact (scraping) of the knives on the advancing wire and thus an inherent wear of the knives is avoided in a simple manner.

According to an embodiment of the invention each cutting member is connected with a pivot arm which is articulated to the carriage. In this manner, regarding a precise guidance of the knives as well as a transmission of the cutting forces, a simple and a reliable structure is obtained. It is of particular advantage to rigidly connect the cutting members with the pivot arm.

Further in accordance with the invention, the support joint of the support arm is mounted on a driven rotary member which constitutes the anchor member and which is supported on the machine frame and further, the axis on the rotary member is parallel-spaced with respect to the pivotal axis of the support joint. This arrangement provides in a simple manner for the transverse motion of the intermediate joint of the support arm during the return motion and for the resetting of the two knives into the initial position to perform a new cutting operation. The particular advantage of this arrangement resides in the fact that despite the mobility of the support joint of the support arm, the cutting forces to be transmittted to the machine frame by the support arms can be taken up in a highly satisfactory manner and further, at a corresponding rpm, the back-and-forth motion of the support joint may be performed very rapidly, thus achieving a high cutting frequency. By coordinating the control of the carriage drive and the drive of the rotary members, the transversal motion of the support joint away from the wire axis may be introduced already when the wire has just been severed by the knives. Thus, subsequent to severing the wire, in addition to the divergent circular path of motion predetermined by the geometry of the support arms, the divergence of the paths of motion in this range is further increased by the above-noted motion of the support joint away from the wire axis.

Further in accordance with the invention, the drive of the rotary members is controlled in such a manner that during a motion of the carriage opposite the advancing direction of the wire, the rotary members execute a rotation of maximum 360°. This rotation begins prior to the return motion of the carriage and terminates after such return motion has been completed. The extent of rotation of the rotary members may consist of a full revolution of 360° or a forward and reverse motion of not more than 180°. In this connection it is of particular advantage to provide that the drive for the rotary members is adjustable regarding the angular displacement of the rotary members during each operational cycle. Such adjustability permits setting the eccentricity between the rotary axis of the rotary member, on the one hand, and the axis of the articulation of the support joint, on the other hand, up to the limit corresponding to the largest wire diameter that is expected to be handled by the cutting apparatus. The eccentricity is so dimensioned that even for a maximum wire diameter there is ensured a sufficient clearance between the knife and the wire during the return motion of the cutting device. In case small-diameter wires are to be cut—particularly of short lengths—with a machine structured in this manner, the maximum operational frequency can be increased by ensuring that a relatively small pivotal angle is described by the rotary member for each operation. The angular displacement is determined here exclusively as a function of the necessary clearance between the wire and the knives during the return motion of the cutting device. If a reversal of rotation within one operational cycle is to be dispensed with, then for reducing the time required for the back-and-forth motion of the support joint, the rpm of the rotary member may accordingly be increased.

According to a further feature of the invention, the respective support joints are mounted on respective slides which constitute the anchor members and which are guided in a direction transverse to the wire axis. The slides are each connected by means of a separate toggle with the machine frame and a drive is coupled to the toggle joint. This arrangement has the advantage that the drive needs to perform only a reciprocating motion and may be effected, for example, by means of a double-acting hydraulic or pneumatic power cylinder. The drive needs to apply only such a force which is necessary for preventing a reverse over-the-center movement of the toggle joint under the effect of the load derived from the cutting force. It is of particular advantage to provide that each support joint is supported on the machine frame by means of a separate associated toggle and that in each toggle one of the links is stationarily articulated to the machine frame.

In order to reduce the force to be applied by the drive to the toggle to be thus able to reduce the dimensions of such drive, it is further advantageous to provide an abutment which is arranged on that side of the toggle that is oriented away from the toggle drive and which can be engaged by the toggle in a slightly over-the-center position. This arrangement ensures that during the cutting operation the cutting force is taken up by the abutment rather than by the toggle drive. Such an arrangement thus permits the use of pneumatic cylinders, that is, the use of compressible media without thereby adversely affecting the required rigid support of the cutting member during the cutting operation. The use of pneumatic drives for shifting the support joint has further the advantage that such shift upon initiation of the return motion effected by the carriage may occur particularly rapidly. In this arrangement the setting for the applicable wire diameter may be effected by providing that the joint of the toggle that is stationarily supported on the machine frame may be adjustable in a direction transverse to the wire axis.

In accordance with a further modification, both slides are connected with one another by means of a toggle and further, the toggle joint is connected with a drive constituted by a piston-and-cylinder unit. This arrangement has in essence the same advantages as the toggle arrangement outlined earlier, but has the additional advantage that the number of the required structural components is reduced from four links to two and that of the drives is reduced from two to a single drive. It is a further advantage of such an arrangement that the links of the toggle are loaded for tension to cause motion of the associated slide, and thus may be more advantageously dimensioned. In this arrangement it is of particular advantage to position the toggle joint on a slide which is guided in the machine frame to execute a reciprocating motion parallel to the direction of wire feed. In this manner, there is ensured a precise uniform guidance of the slides.

In accordance with a further advantageous feature of the invention, the respective knives are mounted on a rocker member articulated to the support arm and the pivot arm and further, in the zone of the articulation of the rocker member abutments are provided on the rocker member and the pivot arm for limiting the swinging motion of the rocker member. By virtue of this modified structure, it is feasible to omit the additional drive for generating the reciprocating motion transversely to the wire axis, since the clearance required between the knives and the wire running between them during the return motion of the carriage may be provided by the carriage itself by ensuring that by means of the pivot arms first the rocker members carrying the knives are moved and only thereafter is a motion of the respective support arm effected. In this connection it is of particular advantage to provide that the length of the support arm is a multiple of the length of the rocker member (measured between the tip of the knife and the articulation at the pivot arm). In this manner, the knife edge performs a circular motion of small radius of curvature and therefore attains a sufficient distance from the wire within a very short period. At least those abutments which become effective upon initiation of the cutting operation are expediently adjustable so that a stable position for the support arm and the rocker member is achieved, that is, a buckling under the effect of the load generated by the cutting forces is avoided.

In accordance with a further embodiment of the invention, there is provided a force-opposing element which applies to the support arm a force that opposes the momentary pivotal motion of the support arm. This arrangement provides that each time the carriage begins to move, first the rocker member is moved up to the respective abutment and only thereafter is a motion of the support arm effected. Thus, the sequence of motions is positively controlled. The force-opposing element may be a double-acting hydraulic damping cylinder or a spring arrangement which may be compressed or tensioned or a friction brake or the like.

In accordance with a further feature of the invention, the cutting impact is dampened by the provision of means with which the distance of the knives of the cutting members is adjustable with respect to one another in the severing position. In this manner, the "residual impact" is significantly dampened during the cutting operation. As soon as, during the severing, a certain residual cross section of the wire is reached which, in essence, depends from the hardness and ductility of the wire material, the wire length to be severed "snaps off" at the location of severance. Thus, the cutting operation is, for all practical purposes, terminated even before the knives arrive into contact with one another. Such a sudden release of the cutting members generate in the cutting device a snapping sound caused directly, for example, by clearances of bearings and elasticities within the cutting apparatus. If now according to the invention means are provided which adjust the distance of the knives with respect to one another in the severing position, the termination of the cutting motion may be so set that the motion of the knives is terminated when the critical residual cross section is attained, that is, the wire will "snap off" even without further motion of the knives. Since such further knife motion is prevented, the cutting impact caused by the sudden release during the wire snap-off is significantly reduced.

According to a further embodiment of the invention with regard to a dampening of the cutting impact, displaceable motion-limiting elements are provided which are arranged in the zone of the cutting member and which are formed of a slightly yielding material, such as a gummy elastic polymerized polyurethane, generally known as Vulkollan. Or, the elements may be constituted of steel springs with a high spring rate. In this embodiment the cutting stroke is so set that the motion-limiting elements arrive in mutual contact in the predetermined cutting position, so that when the wire length snaps off, the cutting members and the drive elements connected therewith are prevented from moving further in the cutting direction. Thus, a sudden release of the respective machine components is avoided.

According to still another embodiment of the invention regarding the dampening of the cutting impact, there are provided a hydraulic power cylinder unit as the drive means to move the support joint transversely to the wire axis and a control device for discontinuing the admission of hydraulic fluid after a predetermined piston stroke is reached. In this embodiment too, the stroke of the cutting member is so limited that the smallest distance between the two knives oriented to one another corresponds to the "critical residual cross section" to which the wire is reduced by the knives. Based on the damping effect of the hydraulic liquid, in this embodiment too, the cutting impact is substantially dampened, since the cutting members, upon reaching the severing position, cannot be further moved transversely in the direction of the wire axis, but are maintained firmly in the predetermined position and thus no further increase of the cutting force occurs which, in essence, is the cause of the cutting impact.

DESCRIPTION OF THE PREFERRED EMBODIMENTS

Figure 1:
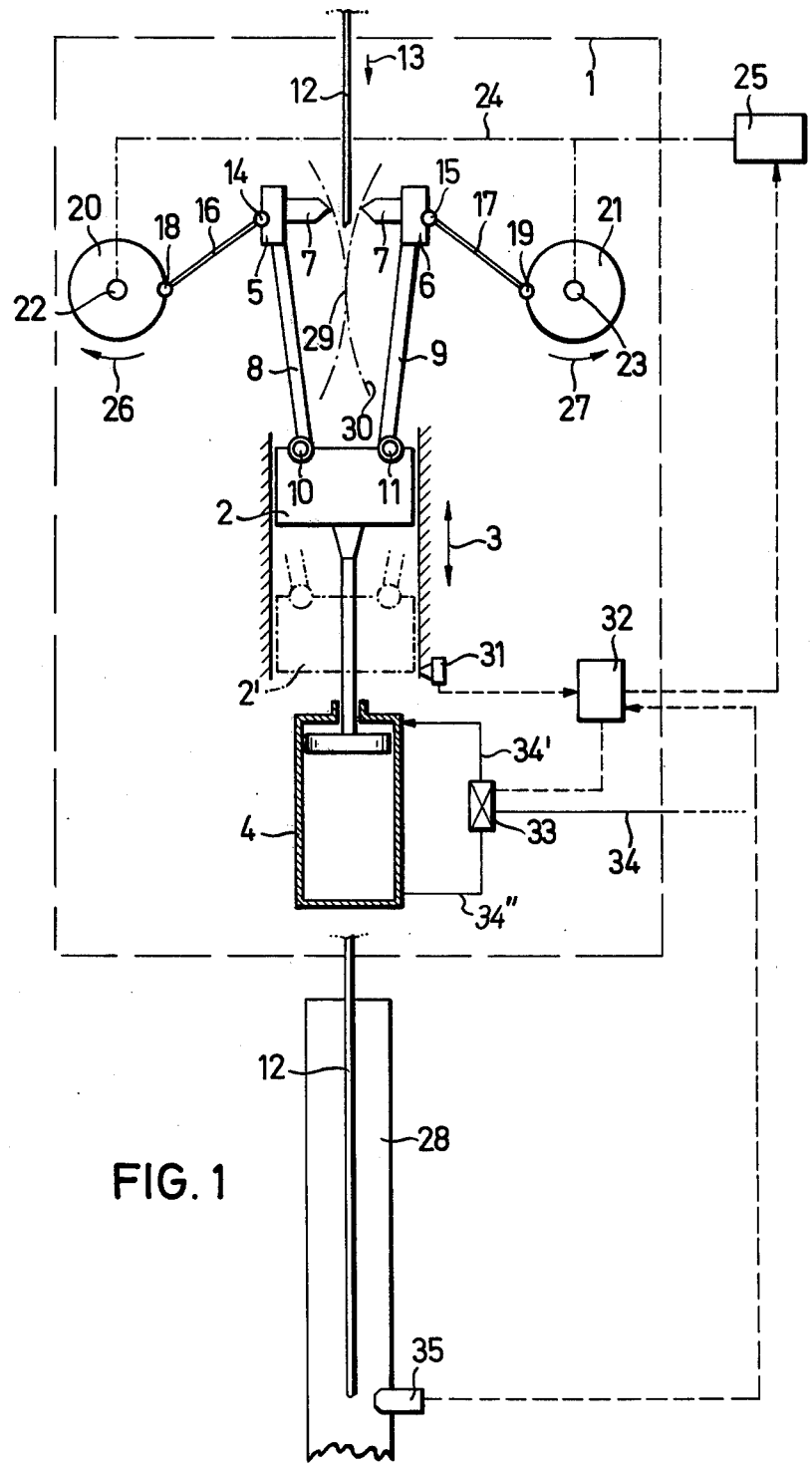
FIG. 1 is a schematic plan view of a preferred embodiment of the invention.

Turning now to FIG. 1, the embodiment illustrated therein has an only symbolically shown machine frame 1, on which there is mounted a carriage 2 in a guide for reciprocation in the direction of the double-headed arrow 3. The carriage 2 is coupled to a driving device, such as a piston-and-cylinder unit 4 which effects the back-and-forth motion of the carriage 2.

On the carriage 2 there are mounted two cutting members 5 and 6 each carrying a respective cutting element, such as a knife 7, which preferably is of the replaceable type. The knives 7 may be arranged and structured in such a manner that during the cutting operation they cooperate in an edge-to-edge manner or may slightly overlap in a scissors-like manner in the closed position. The cutting members 5 and 6 are mounted on the carriage 2 by means of pivot arms 8 and 9, respectively, so that both cutting members may execute a corresponding swinging motion about pivotal joints 10 and 11 in the direction of an advancing wire 12. The direction of motion 3 of the carriage 2 and the advancing direction 13 of the wire 12 are parallel to one another.

To the cutting members 5 and 6, to that side thereof which is oriented away from the respective knife 7, there is pivotally attached a respective support arm 16 and 17 by means of a pivot 14 and 15. The support arms 16 and 17 are articulated at their other end, by means of respective support joints 18 and 19, to respective rotary members 20 and 21, constituting anchor members.

The rotary members 20 and 21 are stationarily supported in the machine frame in such a manner that their respective axis of rotation 22 and 23 is at a distance from the axes of the support joints 18 and 19. Both rotary members 20 and 21 are coupled to a drive 25 as indicated in dash-dot lines 24. The drive 25 turns the rotary members 20 and 21 in opposite directions as indicated with arrows 26 and 27.

In the description which follows, the cutting operation of the above-described apparatus will be set forth.

Portions of predetermined length are to be cut from the wire 12 which is continuously advanced in the direction of the arrow 13 and which passes through the cutting apparatus along a wire path above the carriage 2 and the drive 4. The wire leaves the cutting apparatus through a discharge arrangement 28. For performing the cutting operation, the carriage 2 is, from its position shown in FIG. 1 with solid lines, pulled forwardly (that is, in the direction of the wire advance) by the drive 4. During this operational step, both rotary members 20 and 21 remain at a standstill, the cutting members 5 and 6 fulcrumate about the respective support joints 18 and 19 by means of the support arms 16 and 17, so that the knives 7 converge towards the wire 12 along an approximately circular path 29 and 30, respectively. The knives 7 during their continuing motion towards one another sever the running wire 12. The advancing speed of the carriage 2 is so designed that at least during the period when the knives 7 are in engagement with the wire 12, it is moved with a speed that is identical to that of the advancing wire 12.

Subsequent to the cutting operation proper, the carriage 2 continues to move in the same direction through a short distance to ensure that the knives 7, by virtue of the geometry determined by the support arms 16 and 17, move away from one another and thus from the wire 12.

In the next operational phase, the carriage 2 has to be returned into its initial position in a direction opposing the advancing direction 13 of the wire 12. In order to prevent the knives 7 from contacting the wire 12 during this return motion, the rotary members 20 and 21 are turned by the drive 25 in the direction of the respective arrows 26 and 27, so that in addition to the motion of the cutting members 5 and 6 determined by the curves 29 and 30, they are moved away from the wire 12. As a result, during the return motion of the carriage 2 in which the knives 7 again move along a circular path in the reverse direction, corresponding to the curves 29 and 30, the knives 7 do not contact the running wire 12. Upon completion of the return motion of the carriage 2, the rotary members 20 and 21 have been turned to such an extent that the support joints 18 and 19 again assume their initial position as shown in FIG. 1.

The rotary members 20 and 21 may either have a fixed eccentricity between the respective rotary axes 22 or 23 and the axes of the associated support joints 18 and 19 or may have an adjustable eccentricity. In the latter case, for example, the pin attaching the associated support joint to the rotary member may be adjusted thereon in a radial direction. The only schematically illustrated connection between the rotary members 20 and 21 and the drive 25 may be a gear drive or a chain drive.

The above-described transverse motion of the support joints 18 and 19 during the return motion of the carriage 2 in a direction oriented away from the wire axis and the transverse motion in a direction towards the wire axis during the forward motion of the carriage 2 may be effected either by means of a full revolution of the rotary members 20 and 21, so that the drive 25 needs to move solely in one and the same direction. If desired, for the purpose of adapting the transverse motion of the cutting cycle, the drive motor 25 may be rpm-variable, so that the rotary members 20 and 21 can perform one revolution during variable time periods.

In case there is a fixed eccentricity between the rotary axis 22 and 23 and the axes of the respective support joints 18 and 19 (wherein the eccentricity is calculated for the greatest wire diameter conceivably to be handled by the cutting machine), and wires of relatively small diameters (particularly of relatively short lengths) are to be cut, it may be expedient to provide a drive 25 which has reversible rotary directions. If such a reversible drive 25 is used, the rotary members 20 and 21 are, as the return motion of the carriage 2 is initiated, rotated through a predetermined angle in the direction of the arrows 26 and 27 and subsequently they are turned in the reverse direction back into their initial position.

In case the cutting apparatus is used for severing wire of relatively large diameter and thus large cutting forces are generated, it is expedient to provide, as the rotary members, eccentrics having only a small eccentricity to ensure that the cutting forces transmitted through the drive transmission 24 to the rotary members are taken up securely. In order to adapt the apparatus to different wire diameters, it is expedient in this connection to provide supports for the rotary members 20 and 21 which are adjustable transversely to the advancing direction 13 of the wire 12.

The course of motion of the components during the operation of the cutting apparatus may be controlled, for example, in the following manner: as the carriage 2 reaches its phantom-line position 2', a switch or sensor 31 triggers a signal which is applied to a control device 32. The latter emits a control signal which is applied to the drive 25 which, in response, starts the rotary motion of the rotary members 20 and 21. Simultaneously, or after a predetermined delay, the control device 32 emits a second control pulse which is applied to a reversing valve 33 inserted in a pressure conduit 34 leading to the piston-and-cylinder unit 4 with branches 34' and 34". In response to this control pulse, the reversing valve 33 routes pressurized medium through the conduit 34" into the unit 4 and, as a result, the carriage 2 is moved back into its initial position. The drive 25 is so designed that it shuts off subsequent to a full revolution of the rotary members 20 and 21. Similar considerations apply to a drive for rotary members in which the latter do not execute a full revolution, but are oscillated back-and-forth. In such an embodiment, the reversal of the drive during one operational cycle has to be triggered automatically.

The initiation of the cutting operation, that is, the triggering of the motion of the carriage 2 in the direction of the arrow 13 can be effected manually or by means of a length sensor arranged at the wire discharge device 28. Such a sensor which is designated at 35, responds as the leading wire terminus moves past. The control signal emitted by the sensor 35 is applied to the control device 32 which causes the reversing valve 33 to be switched so that the piston of the piston-and-cylinder unit 4 is pressurized by pressure medium introduced through the branch conduit 34'.

Figure 2:
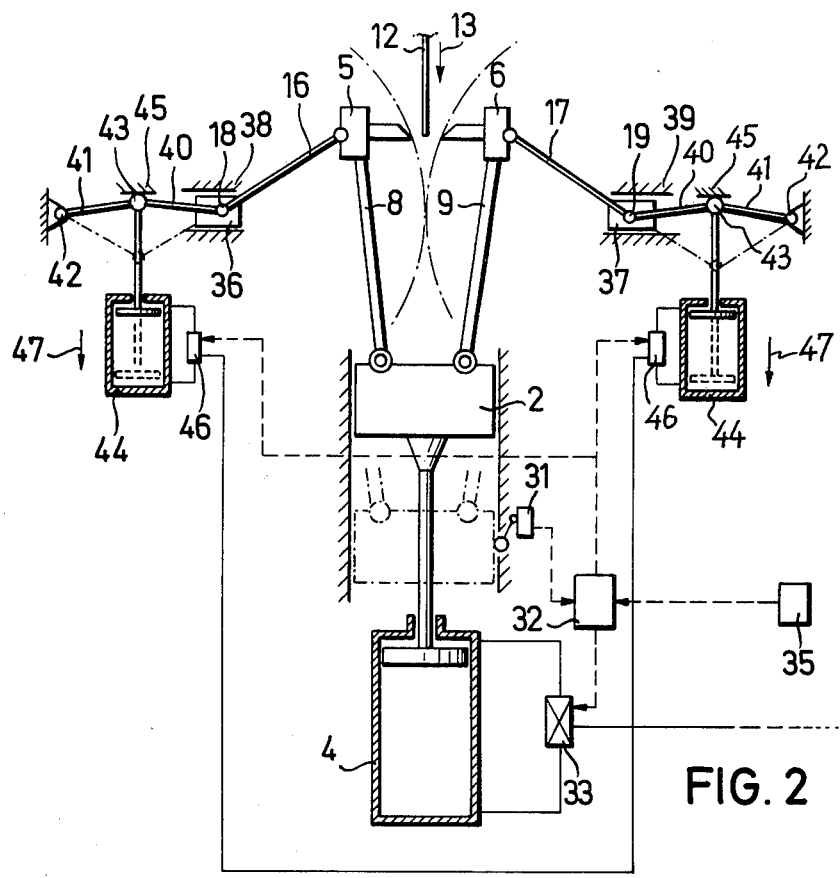
FIG. 2 is a schematic plan view of another preferred embodiment of the invention.

Turning now to FIG. 2, there is illustrated an embodiment of the cutting apparatus which, regarding its essential components and basic operation, corresponds to the embodiment described in connection with FIG. 1. The embodiment illustrated in FIG. 2 differs from that of FIG. 1 in that the anchor members for the support joints 18 and 19 are not rotary members as in the FIG. 1 embodiment, but slides 36 (for the support joint 18) and 37 (for the support joint 19) which are movable back-and-forth in respective guide tracks 38 and 39 attached to the machine frame (not shown in FIG. 2) in a direction transverse to the axis of the wire 12. Each slide 36 and 37 is associated with a separate toggle. Each toggle is articulated by a stationary joint to the machine frame and is separately driven as will be now described only in connection with the slide 36. The toggle is formed of a link 40 articulated to the slide 36 at 18 and a link 41 articulated to the machine frame at a stationary articulation 42. The respective other ends of the links 40 and 41 are connected to one another by means of a toggle joint 43 which, in turn, is coupled to a drive 44, such as a power cylinder unit, by means of which the toggle may be moved into its phantom-line position. On that side of the toggle which is remote from the drive 44 there is arranged a stationary abutment 45 against which the toggle joint 43 may be pressed by the drive 44. As indicated earlier, the toggle arrangement and its drive are duplicated for the slide 37.

The embodiment described in connection with FIG. 2 operates as follows:

In the illustrated initial position each toggle is in its straightened, slightly over-the-center position in which it is held by the respective drive 44. After the cutting operation has been performed by means of a carriage motion as described in connection with the embodiment illustrated in FIG. 1, the drives 44, preferably shortly before the return motion of the carriage 2 is initiated, move the toggles 40, 41 into the phantom-line position. As a result, the slides 36 and 37 move away from the wire axis so that the cutting elements 5 and 6 may be moved into their initial position while they are at a sufficient distance from the wire. Subsequently, the toggles are placed by the respective drives 44 into their position shown in solid line in FIG. 2.

It is an advantage of the embodiment illustrated in FIG. 2 that the load exerted by the cutting forces is fully taken up by the links 40 and 41 of the toggles so that the drives 44 need to exert only so much force as necessary to overcome the buckling force urging the toggle joints 43 into an over-the-center position. If the abutments 45 are so arranged that in the illustrated cutting position the toggle joints 43 are moved slightly over center as viewed from the respective drive 44, the loads applied by the toggle-moving (buckling) forces are fully taken up by the abutments 45, while the drives 44 need to exert only so much force that is necessary to prevent the toggle joints 43 from moving away from the respective abutment as a result of, for example, accidental jars or vibrations. Thus, in such a case the drives 44 need to be designed only for delivering a sufficient force for the desired rapid back-and-forth motion of the slides 36 and 37. In such a variant it is feasible to use pneumatic piston-and-cylinder units for the drives 44, since the compressibility of the pressure medium plays no role in this instance, because the load generated by the cutting forces is entirely taken up by the machine frame.

The control of the cutting apparatus illustrated in FIG. 2 is effected in the same manner as described in connection with the FIG. 1 embodiment. Thus, again a length sensor 35 applies a starting pulse to the control device 32, whereupon the drive 4 causes motion of the carriage 2 in the direction of the arrow 13. A sensor or switch 31 switches respective reversing valves 46 of the drives 44 to cause an over-the-center motion of the toggles 40, 41 in the direction of the arrows 47 and simultaneously also switches the reversing valve 33 of the drive 4, so that the carriage 2 starts its return motion opposite the wire feeding direction 13. Upon completion of the return motion of the carriage 2, the reversing valves 46 are switched in such a manner by the control devices 32 (possibly by means of sensors cooperating with the carriage 2) that they cause the toggle joints 43 to arrive into engagement with the respective abutments 45 and thus the cutting apparatus again assumes its initial position, ready for the subsequent cutting operation.

Figure 3:
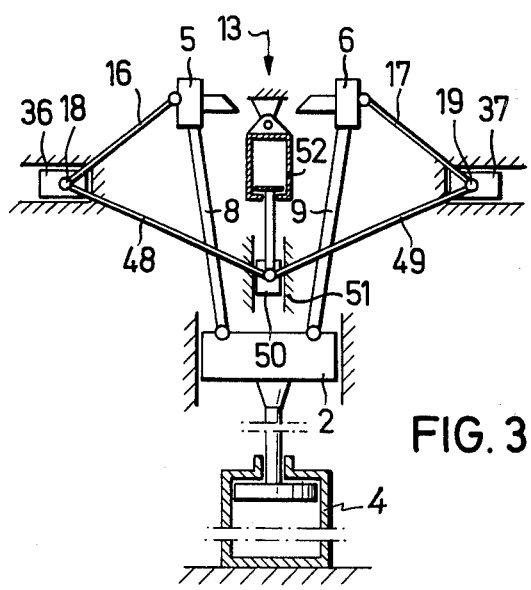
FIG. 3 is a schematic plan view of a modification of the structure illustrated in FIG. 2.

FIG. 3 illustrates a further variant to the arrangement described in connection with FIG. 2. In this variant too, the cutting members 5 and 6 are connected by pivot arms 8 and 9 with a carriage 2. Further, the cutting members 5 and 6 are supported by support arms 16 and 17 on slides 36 and 37 guided in the machine frame. Departing from the FIG. 2 structure, the two slides 36 and 37, however, are connected with one another by means of two levers 48 and 49 which are articulated to a slide 50. The latter is guided in a guide track 51 affixed to the machine frame, so that the slide 50 can execute a reciprocating motion parallel to the feeding direction indicated by the arrow 13. Further, with the slide 50 there is connected a drive 52 which may be constituted by a piston-and-cylinder unit supported on the machine frame. In the FIG. 3 arrangement again, the course of motion of the cutting members 5 and 6 is, during the cutting operation, identical to that described in connection with the embodiments of FIGS. 1 and 2. The transverse motion of the support joints 18 and 19 of the respective support arms 16 and 17 on the slides 36 and 37 is effected by the power cylinder unit 52. Prior to and during the cutting operation, the pressure medium in the piston-and-cylinder unit 52 holds the levers 48 and 49 in their position shown in FIG. 3, while the slides 36 and 37 may be pressed against an abutment (not shown) mounted on the machine frame. After the cutting operation proper has been performed, the slide 50 is moved, similarly to the embodiments of FIGS. 1 and 2, by the drive 52 opposite the advancing direction 13 of the wire 12 and thus the two support joints 18 and 19 are moved away from the wire axis so that the cutting members 5 and 6 may move freely along the wire during the return motion of the carriage 2. Subsequently, the drive 52 is switched and thus the slide 50 is again moved into its initial position so that the cutting apparatus is ready to perform the subsequent cutting operation. In this embodiment the drive 52 has to be dimensioned for taking up the load derived from the cutting forces. Since in this embodiment too, a toggle-type force-transmitting arrangement (formed of levers 48 and 49) is used, the forces to be applied by the drive 52 for maintaining the slides 36 and 37 in position against the cutting forces introduced by the support arms 16 and 17 can be relatively low.

Figure 4:
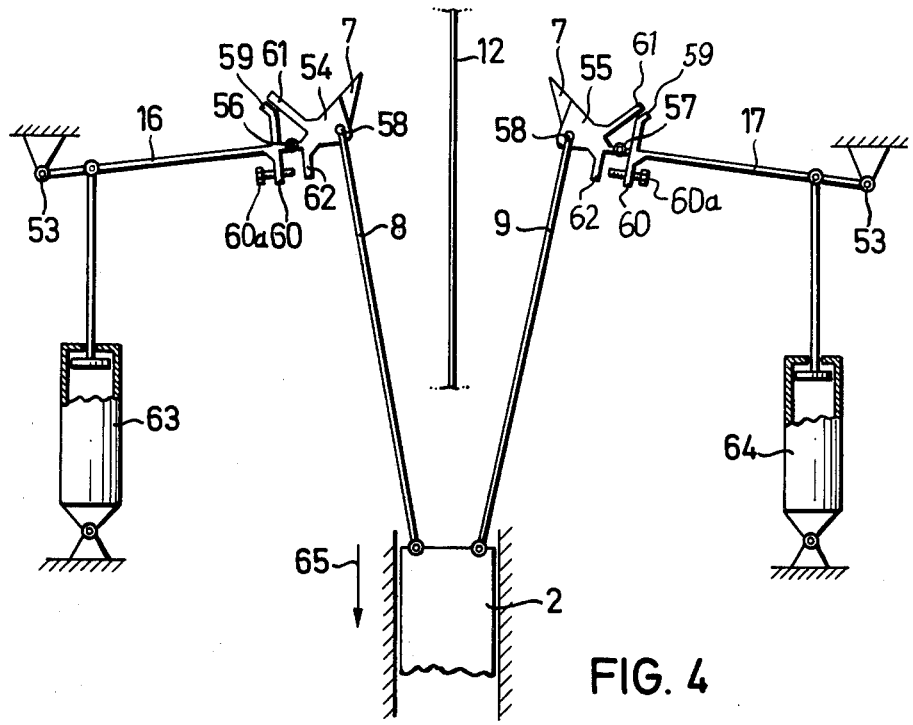
FIG. 4 is a schematic plan view of still another embodiment of the invention.

Turning now to FIG. 4, in the embodiment shown therein the support arms 16 and 17 are articulated to the machine frame by respective joints 53. To the other end of the support arms 16 and 17 there are articulated rocker members 54 and 55, respectively, each carrying a knife 7 at its outer end. At a distance from the articulations 56 and 57, by means of which the rocker members 54 and 55 are articulated to their respective support arm 16 or 17 to the rocker members 54 and 55 there are articulated, at 58, pivot arms 8 and 9 which, at their other end, are articulated to the carriage 2. The joint 56 or 57, respectively, is arranged between the respective pivotal point 58 of the pivot arm 8 or 9 and the joint 53.

On each rocker member 54, 55 as well as on the support arms 16 and 17 in the zone of the articulations 56 and 57 there are bilaterally provided fixed abutments 59, 60 and 61, 62, respectively, which limit the pivotal motion of the rocker members 54 and 55 about the respective articulation 56 or 57. At least the abutment pairs 60, 62 oriented towards the carriage 2 are adjustable, for example by means of a respective set screw 60a.

The support arms 16 and 17 are connected each with force-opposing devices 63 and 64, respectively, which apply a force opposing the momentary pivotal motion of the support arm. If now the carriage 2 is moved in the direction of the arrow 65, first the rocker members 54 and 55 are swung by means of the pivot arms 8 and 9 in the direction of the wire 12. Only after the abutment 62 on each rocker member engages the abutment 60 on the support arm, does the pivotal motion of the support arms 16 and 17 about the articulation 53 occur. As a result of this last-named motion, the knives 7 are caused to directly contact the wire and sever the same. The force-opposing devices 63 and 64 which expediently are hydraulic dashpots, ensure that upon initiation of the carriage motion, first the rocker members 54 and 55 are swung towards the associated abutments and only thereafter does a pivotal motion of the support arms 16 and 17 occur.

As soon as the carriage 2 is moved in a direction opposite to that indicated by the arrow 65 upon completion of the cutting operation proper, first the rocker members 54 and 55 are caused to execute a swinging motion since, due to the opposing force applied by the force-opposing devices 63 and 64, the support arms 16 and 17 resist to a greater extent the force transmitted by the pivot arms 8 and 9 than the rocker members 54, 55. Since the distance between the cutting edges of the knives 7 and the articulations 56 and 57 is significantly smaller than the distance between the joints 56 and 57, on the one hand, and the associated joints 53, on the other hand, there is obtained, due to the backward swinging motion of the rocker members 54 and 55 up to the associated abutments 59 and 61, a sufficient free space between the cutting edges and the wire. Consequently, during the subsequently performed pivotal motion of the support arms 16 and 17, the knives move past the wire without touching the same.

Figure 5:
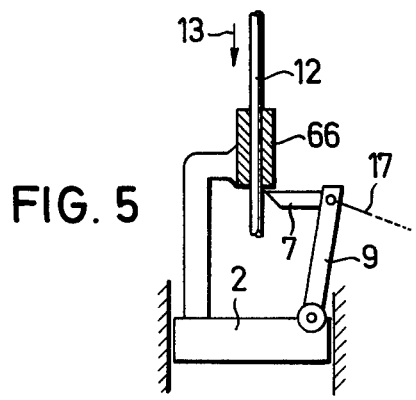
FIG. 5 is a plan view of an embodiment of the cutting member according to the invention.

The embodiments described above perform a so-called "chisel" cut which produces a pointed (conical) end of the wire length. In certain cases a planar transversal cut may be desirable which can also be obtained by a cutting apparatus designed according to the invention. In this connection reference is made to FIG. 5. The wire 12 is continuously advanced in the direction of the arrow 13 and is passed through a shearing sleeve 66 which is known by itself and which is directly affixed to the carriage 2. The leading end face of the sleeve 66 defines a cutting face and cooperates with the knife 7 which is coupled to a pivot arm 9 and a support arm 17 in a manner described in connection with the previous embodiments and is guided thereby accordingly.

Figure 6:
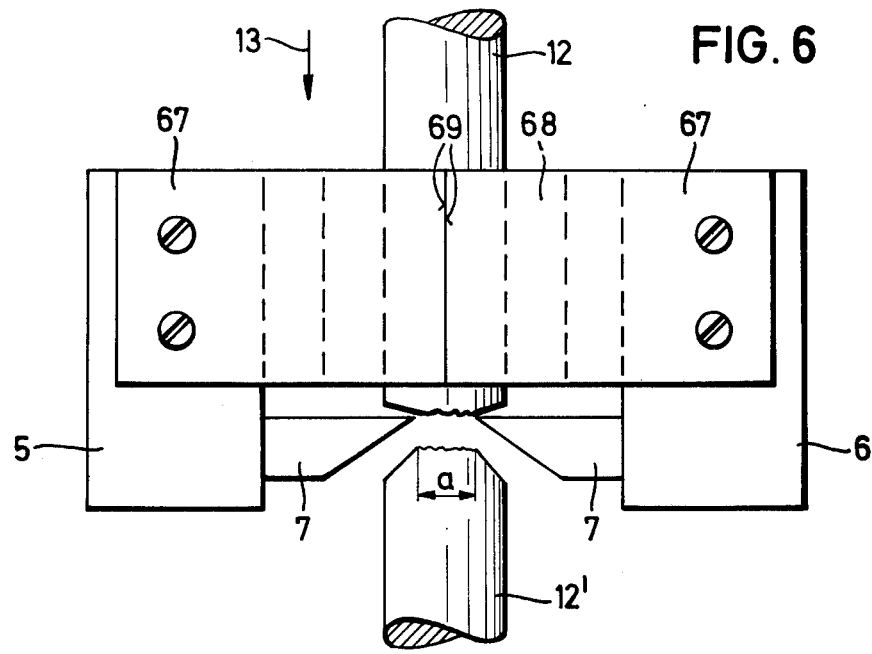
FIG. 6 is a plan view of a detail for damping the cutting impact according to the invention.

Turning now to FIG. 6, there is illustrated a simple embodiment for damping the cutting impact. To both cutting members 5 and 6, there are attached motion limiting members 67 which have a horseshoe-shaped opening 68. The two openings 68 are so dimensioned and oriented to one another that a wire of the greatest diameter to be handled by the machine may freely pass therethrough. The limiting elements 67 may be adjustable on the cutting members 5 and 6 so that the distance between the two knives 7 in the severing position shown in FIG. 6 (in which the elements 67 are in an abutting relationship with one another) can be altered. The distance between the knives 7 is so set that it approximately corresponds to the residual cross section a along which the wire length 12' snaps off as the result of the severing operation but which, itself, has not been actually cut by the knives 7. Otherwise, the actuation of the support arms 16 and 17 and the associated support joints 18 and 19 (not shown in FIG. 6) may be effected according to the embodiments of FIG. 1, 2 or 3 and is so designed that when the cutting is completed, the end faces 69 of the limiting elements 67 firmly engage one another.

Figure 7:
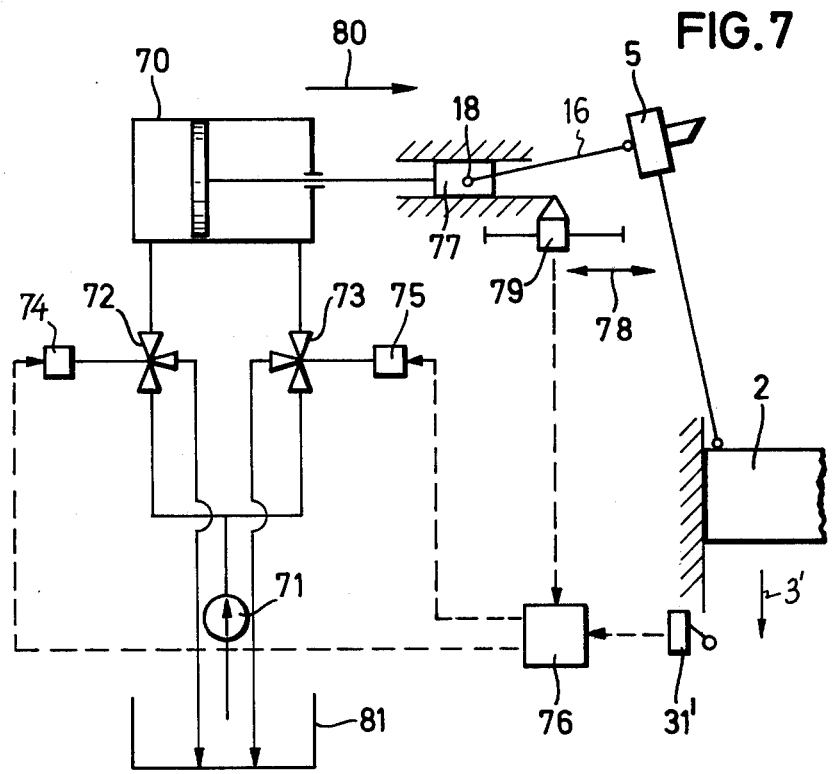
FIG. 7 is a schematic plan view of a further embodiment of the invention.

Turning now to FIG. 7, there is illustrated a more complex embodiment of the cutting apparatus according to the invention, particularly for the purpose of limiting the cutting impact. This embodiment is described in conjunction with only one half of the cutting apparatus (the cutting member 5); the system may be duplicated for the other half (the cutting member 6). In this embodiment the support joint 18 is driven by means of a hydraulic double-acting piston-and-cylinder assembly 70. The latter is supplied with pressurized medium by a pump 71; the cylinder chambers on either side of the piston of the unit 70 are controlled by respective three-way valves 72 and 73. The valves 72 and 73 are each provided with a setter 74 and 75, respectively, which are actuated by a control device 76.

The support joint 18 which is mounted, for example, on a slide 77 constituting an anchor member for the support arm 16, is connected with a signal emitter 79 which is adjustable in the direction of the double-headed arrow 78. The signal emitter 79 generates a pulse when the slide 77 has reached a predetermined position during a motion in the direction of the arrow 80. Thus, the motion of the cutting member 5 towards the cutting position may be monitored. The signal emitter 79 applies its pulse to the control device 76. This arrangement ensures that during a motion in the direction of the arrow 80 and upon assumption of a location predetermined by the signal emitter 79, the admission of hydraulic medium through the valve 72 may be cut off, thus stopping the motion of the cutting member 5. If now subsequent to the cutting operation proper which is effected by means of a motion of the carriage 2 in the direction of the arrow 3', the cutting member is to be withdrawn, a signal emitter 31' (which senses the position of the carriage 2) applies a signal to the control device 76, triggered shortly before the carriage 2 reaches its point of reversal. In response, the control device 76 causes the valve 73 to establish communication with the corresponding cylinder chamber and the pump 71 and simultaneously switches the valve 72 so that a withdrawal of pressurized fluid from the other cylinder chamber into the sump 81 may occur. By a corresponding switching, by means of the control device 76 after the return motion of the carriage 2 into its initial position as discussed in connection with the embodiments illustrated in FIG. 1 or 2, the valves 72 and 73 are so switched that the piston again moves in the direction of the arrow 80 and thus a new cutting operation may take place.

The FIG. 7 system relating in particular to the damping of the cutting impact is not limited to the shown arrangement, but may find application with certain modifications in other embodiments for displacing the support joints 18 or 19 transversely to the wire path.

It is to be understood that the above description of the present invention is susceptible to various modifications, changes and adaptations, and the same are intended to be comprehended within the meaning and range of equivalents of the appended claims.

I claim:
1. A cutting apparatus for severing a wire continuously advanced through the apparatus along a wire path in a feeding direction parallel to the wire axis, comprising:
  (a) a machine frame;
  (b) a carriage supported for displacement parallel to said feeding direction;
  (c) two cutting members;
  (d) means connecting said cutting members with said carriage;
  (e) a support arm articulated to at least one of said cutting members;
  (f) displaceable anchor means comprising a slide;
  (g) a support joint arranged on said support arm at a distance from the associated cutting member and articulating said support arm to said displaceable anchor means;
  (h) drive means for moving said carriage in and opposite said feeding direction to cause, with the cooperation of said anchor means and said support arm, a motion of the cutting member in an arcuate path towards and, subsequent to severing, away from the wire path and the other cutting member;
  (i) a force-exerting means comprising an additional drive means for shifting said anchor means to effect a displacement of said support joint and said support arm for affecting the course of the arcuate path of said cutting member;
  (j) means for guiding said slide in said machine frame transversely to said feeding direction; and
  (k) a toggle having first and second toggle links connected to one another by a toggle joint; said first toggle link being articulated to said slide and said additional drive means being connected to said toggle joint.

2. A cutting apparatus as defined in claim 1, wherein said second toggle link is stationarily articulated to said machine frame; further comprising a stationary abutment situated at that side of the toggle links which is remote from said additional drive means; said toggle joint being in engagement with said stationary abutment in an extended position of said toggle.

3. A cutting apparatus for severing a wire continuously advanced through the apparatus along a wire path in a feeding direction parallel to the wire axis, comprising:
(a) a carriage supported for displacement parallel to said feeding direction;
(b) two cutting members;
(c) means connecting said cutting members with said carriage;
(d) a support arm articulated to at least one of said cutting members;
(e) displaceable anchor means comprising first and second slides coupled, respectively, to the one and the other cutting member;
(f) a support joint arranged on said support arm at a distance from the associated cutting member and articulating said support arm to said displaceable anchor means;
(g) drive means for moving said carriage in and opposite said feeding direction to cause, with the cooperation of said anchor means and said support arm, a motion of the cutting member in an arcuate path towards and, subsequent to severing, away from the wire path and the other cutting member;
(h) a force-exerting means comprising an additional drive means for shifting said anchor means to effect a displacement of said support joint and said support arm for affecting the course of the arcuate path of said cutting member;
(i) means for guiding said slides transversely to said feeding direction; and
(j) a toggle having first and second toggle links connected to one another by a toggle joint; said first toggle link being articulated to said first slide and said second toggle link being articulated to said second slide and said additional drive means being connected to said toggle joint.

4. A cutting apparatus as defined in claim 3, further comprising a third slide forming part of said additional drive means and articulated to said toggle joint; and means for guiding said third slide and said toggle joint parallel to said feeding direction.

5. A cutting apparatus for severing a wire continuously advanced through the apparatus along a wire path in a feeding direction parallel to the wire axis, comprising:
(a) a machine frame;
(b) a carriage supported for displacement parallel to said feeding direction;
(c) two cutting members;
(d) means connecting said cutting members with said carriage;
(e) a support arm articulated to at least one of said cutting members;
(f) displaceable anchor means including a force-opposing means;
(g) a support joint arranged on said support arm at a distance from the associated cutting member and articulating said support arm to said displaceable anchor means;
(h) drive means for moving said carriage in and opposite said feeding direction to cause, with the cooperation of said anchor means and said support arm, a motion of the cutting member in an arcuate path towards and, subsequent to severing, away from the wire path and the other cutting member; said drive means further constituting a force-exerting means for shifting said anchor means to effect a displacement of said support joint and said support arm for affecting the course of the arcuate path of said cutting member;
(i) a rocker member included in at least one of said cutting members and articulated to an end of the respective support arm;
(j) a stationary joint supported on said machine frame and articulating said support arm to said machine frame; said force-opposing means opposing the motion of said support arm about said stationary joint; said support joint being carried on said support arm between said stationary joint and said rocker member; and
(k) cooperating abutment means carried on said rocker member and said respective support arm for limiting the range of pivotal motion of said rocker member with respect to the support arm.

6. A cutting apparatus as defined in claim 3, wherein said abutment means is adjustable for varying said range.

7. A cutting apparatus as defined in claim 3, wherein said force-opposing means includes a dashpot.

8. A cutting apparatus for severing a wire continuously advanced through the apparatus along a wire path in a feeding direction parallel to the wire axis, comprising:
(a) a carriage supported for displacement parallel to said feeding direction;
(b) two cutting members, each including a cutting knife having a cutting edge, each cutting knife assuming, during cutting, a severing position in which the cut wire length separates and in which said cutting edges are at a predetermined distance with respect to one another;
(c) limiting means for preventing said cutting knives from moving closer to one another from said severing position;
(d) means for adjusting said predetermined distance;
(e) means connecting said cutting members with said carriage;
(f) a support arm articulated to at least one of said cutting members;
(g) displaceable anchor means;
(h) a support joint arranged on said support arm at a distance from the associated cutting member and articulating said support arm to said displaceable anchor means;
(i) drive means for moving said carriage in and opposite said feeding direction to cause, with the cooperation of said anchor means and said support arm, a motion of the cutting member in an arcuate path towards and, subsequent to severing, away from the wire path and the other cutting member; and
(j) a force-exerting means for shifting said anchor means to effect a displacement of said support joint and said support arm for affecting the course of the arcuate path of said cutting member.

9. A cutting apparatus as defined in claim 8, wherein said limiting means include adjustable cooperating abutting elements mounted on said cutting members.

10. A cutting apparatus as defined in claim 9, wherein said abutting elements are of a slightly yielding material.

11. A cutting apparatus as defined in claim 8, wherein said force-exerting means incorporates said limiting means and said means for adjusting said predetermined distance; said force-exerting means comprising (a) a power cylinder unit including a cylinder and a piston slidably received in said cylinder and connected to said support joint for moving said support joint transversely to said feeding direction;

(b) fluid pressure supply means for pressurizing said cylinder to selectively move said support joint towards and away from said wire path; and (c) fluid pressure control means connected to said fluid pressure supply means for controlling the admission of pressurized fluid into and its withdrawal from said cylinder; said fluid pressure control means including an adjustable sensor sensing, at least indirectly, the position of the associated cutting member with respect to said wire path for effecting blockage of said piston and said associated cutting member when said associated cutting member has reached a predetermined position during its motion towards said wire path.

* * * * *